United States Patent
Tanuma (10) Patent No.: US 11,366,662 B2
(45) Date of Patent: Jun. 21, 2022

(54) HIGH-LEVEL SYNTHESIS MULTIPROCESSOR SYSTEM AND THE LIKE

(71) Applicant: El Amina Inc., Tokyo (JP)

(72) Inventor: Hideki Tanuma, Tokyo (JP)

(73) Assignee: El Amina Inc., Tokyo (JP)

( * ) Notice: Subject to any disclaimer, the term of this patent is extended or adjusted under 35 U.S.C. 154(b) by 0 days.

(21) Appl. No.: 17/269,114

(22) PCT Filed: Aug. 22, 2018

(86) PCT No.: PCT/JP2018/030939
§ 371 (c)(1),
(2) Date: Feb. 17, 2021

(87) PCT Pub. No.: WO2020/035957
PCT Pub. Date: Feb. 20, 2020

(65) Prior Publication Data
US 2021/0311732 A1    Oct. 7, 2021

(30) Foreign Application Priority Data

Aug. 17, 2018   (JP) .............................. JP2018-153737

(51) Int. Cl.
*G06F 9/30*    (2018.01)
*G06F 9/38*    (2018.01)
(Continued)

(52) U.S. Cl.
CPC .......... *G06F 9/3001* (2013.01); *G06F 9/3824* (2013.01); *G06F 9/3836* (2013.01); *G06F 9/44505* (2013.01); *G06F 9/5044* (2013.01)

(58) Field of Classification Search
None
See application file for complete search history.

(56) References Cited

U.S. PATENT DOCUMENTS

2009/0070553 A1* 3/2009 Wallach ............. G06F 9/30185
712/34
2010/0037024 A1* 2/2010 Brewer ............... G06F 12/0607
711/127
(Continued)

FOREIGN PATENT DOCUMENTS

JP    2006-259805 A    9/2006
JP    2009-538481 A    11/2009
(Continued)

OTHER PUBLICATIONS

International Search Report issued in Application No. PCT/JP2018/030939, dated Nov. 20, 2018 (5 pages).
(Continued)

*Primary Examiner* — Eric Coleman
(74) *Attorney, Agent, or Firm* — Osha Bergman Watanabe & Burton LLP (57) ABSTRACT

A high-level synthesis multiprocessor system enables sophisticated algorithms to be easily realized by almost a smallest circuit. A shared memory is divided into a plurality of banks. The memory banks are connected to processors, respectively. Each processor receives an instruction code and an operand from its connected memory bank. After the operation execution, the processor sends the result to its adjacent processor element to set it as an accumulator value at the time of execution of a next instruction. A software program to be executed is fixed. A processor to execute each instruction in the software program is uniquely identified. Each processor has a function for executing its instruction out of all executable instructions in the multiprocessor system, and does not have a function for executing an instruction that the processor is not to execute. The circuit configuration with unused instructions deleted is provided.

12 Claims, 8 Drawing Sheets

(51) Int. Cl.
*G06F 9/445* (2018.01)
*G06F 9/50* (2006.01)

(56) References Cited

U.S. PATENT DOCUMENTS

2012/0159127 A1* 6/2012 Spradlin ................. G06F 21/53
712/E9.016
2017/0090931 A1* 3/2017 Frazier ................ G06F 9/30076

FOREIGN PATENT DOCUMENTS

JP          2014-16773 A      1/2014
WO    WO-2007072324 A2 *  6/2007    ......... G06F 12/0284

OTHER PUBLICATIONS

Written Opinion issued in International Application No. PCT/JP2018/030939, dated Nov. 20, 2018 (12 pages).

* cited by examiner

| MEMORY AREA | INSTRUCTION CODE | OPERAND Y |
|---|---|---|
| PROGRAM EXECUTION MEMORY | NON-REWRITABLE (ROM) | REWRITABLE (RAM) |
| IPLROM | NON-REWRITABLE (ROM) | NON-REWRITABLE (ROM) |

[FIG. 6]

| code | +0 | +1 | +2 | +3 | +4 | +5 | +6 | +7 |
|---|---|---|---|---|---|---|---|---|
| 00 | get / data $PC \leftarrow X; X \leftarrow Y$ | | | | | | | |
| 10~17 | load $X \leftarrow Y$ | zero $X \leftarrow 0$ | notand $X \leftarrow $~$X$&$Y$ | and $X \leftarrow X$&$Y$ | xor $X \leftarrow X$^$Y$ | nop $X \leftarrow X$ | or $X \leftarrow X|Y$ | andnot $X \leftarrow X$&~$Y$ |
| 18~1F | loadnot $X \leftarrow $~$Y$ | fill $X \leftarrow -1$ | ornot $X \leftarrow X|$~$Y$ | nand $X \leftarrow $~$(X$&$Y)$ | xnor $X \leftarrow $~$(X$^$Y)$ | not $X \leftarrow $~$X$ | nor $X \leftarrow $~$(X|Y)$ | notor $X \leftarrow $~$X|Y$ |
| 25 | lock if(LC==0) LC$\leftarrow$X else PC$\leftarrow$PC | | | | | | | |
| 35 | halt PC$\leftarrow$PC | | | | | | | |
| 45 | put [Y]$\leftarrow$X | | | | | | | |
| 80~BF | UNCONDITIONAL AND CONDITIONAL JUMP if(condition)PC$\leftarrow$Y | | | | | | | |
| C0~C8 | add A$\leftarrow$ X+Y | adc A$\leftarrow$X +Y+C | sub A$\leftarrow$ X-Y | sbb A$\leftarrow$ X-Y-C | rsub A$\leftarrow$ Y-X | rsbb A$\leftarrow$ Y-X-C | | |
| D0~D7 | | mul A$\leftarrow$ X*Y | mulh A$\leftarrow$X*Y >>>32 | mulhl A$\leftarrow$X*Y ^X*Y >>>32 | | shl A$\leftarrow$ X<<Y | shr A$\leftarrow$X >>>Y | rol A$\leftarrow$X<<Y^ X>>>(32-Y) |
| D8~DF | | imul A$\leftarrow$ X*Y | imulh A$\leftarrow$X*Y >>32 | | | sal A$\leftarrow$ X<<Y | sar A$\leftarrow$ X>>Y | |
| F0~FF | INPUT/OUTPUT PORT (NO RETRY) out$\leftarrow$(X,Y);A$\leftarrow$in | | | | | | | |
| F0~FF | INPUT/OUTPUT PORT (RETRY) do{out$\leftarrow$(X,Y)}while(in.retry);A$\leftarrow$in | | | | | | | |

| CODE | INSTRUCTION | OPERATION TO BE EXECUTED (PC ← PC+1 IS OMITTED) |
|---|---|---|
| 0000 | OR | X←Y or X |
| 0001 | LOAD | X←Y |
| 0010 | XOR | X←Y xor X |
| 0011 | AND | X←Y and X |
| 0100 | ADD | Acc←Y + X |
| 0101 | SUB | Acc←Y - X |
| 0110 | ADC | Acc←Y + X + C |
| 0111 | SBB | Acc←Y - X - C |
| 1000 | JUMP,HALT | if (condition) PC←Y |
| 1001 | GET,DATA | PC←X, X←Y(X←[X],PC←Y) |
| 1010 | PUT | if (failed) PC←PC else [Y]←X |
| 1011 | LOCK,UNLOCK | if (Y!=0) unlock else if (locked) PC←PC else lock |
| 1100 | FORK | if (failed) C←1 else PC'←Y,Acc'←0:X,C←0 |
| 1101 | | |
| 1110 | | |
| 1111 | | |

[FIG. 10]

| ADDRESS | INSTRUCTION | OPERAND | OPERATION TO BE EXECUTED | REGISTER X |
|---|---|---|---|---|
| 100 | LOAD | B | X←B | B |
| 101 | SUB | A | X←A-X | A-B |
| 102 | PUT | 105 | [105]←X | A-B |
| 103 | LOAD | D | X←D | D |
| 104 | SUB | C | X←C-X | C-D |
| 105 | ADD | - | X←Y+X | A-B+C-D |

[FIG. 11]

| ADDRESS | INSTRUCTION | OPERAND | ANNOTATION |
|---|---|---|---|
| | | | CRITICAL SECTION START |
| 100 | LOCK | LOCK PERIOD | PROCESSOR OF BANK OF ADDRESS 100 IS LOCKED IN A SPECIFIED PERIOD OF TIME. OPERAND LOCK PERIOD IS THE NUMBER OF CLOCKS UNTIL WRITE-BACK BY PUT INSTRUCTION AT ADDRESS 104 IS COMPLETED. |
| 101 | JUMP | 100 | JUMP TO NEXT INSTRUCTION, IF CS IS UNLOCKED. JUMP TO LOCK INSTRUCTION, IF CS IS LOCKED. |
| 102 | PUT | 105 | SAVE REGISTER X. |
| 103 | LOAD | 100 | JUMP DESTINATION ADDRESS, IF CS IS LOCKED. |
| 104 | PUT | 101 | CHANGE JUMP INSTRUCTION DESTINATION TO LOCK INSTRUCTION. |
| 105 | LOAD | , | RESTORE REGISTER X. |
| | | | CRITICAL SECTION END |
| 200 | LOAD | 102 | JUMP DESTINATION ADDRESS, IF CS IS UNLOCKED. |
| 201 | PUT | 101 | CHANGE JUMP INSTRUCTION DESTINATION TO NEXT INSTRUCTION. |

HIGH-LEVEL SYNTHESIS MULTIPROCESSOR SYSTEM AND THE LIKE

TECHNICAL FIELD

The present disclosure relates to a high-level synthesis multiprocessor system and the like. For example, the present disclosure relates to a method for hardware design of multiprocessor architectures using software description, and high-level synthesis for realizing the hardware design method with efficient circuits. More specifically, the present disclosure relates to a method for designing Application Specific Integrated Circuits (ASICs) or Systems-on-a-Chip (SoC) using multiprocessor architectures.

BACKGROUND ART

In the development of ASICs and SoC, hardware description languages have been widely used for circuit design. However, hardware description languages cause heavy burden on the development, since hardware description languages usually require complicated description of sequential circuits for implementing algorithms, compared with software description languages. To alleviate this burden on the implementation of algorithms, a technology called high-level synthesis has been developed, in which circuits can be designed using software description languages.

SUMMARY OF INVENTION

Technical Problem

In a most basic configuration of the high-level synthesis, the content of processing described as software is converted into register transfer level logic and into a hardware description language to execute logic synthesis. The problem of this method is that, as the amount of description of the software increases, the amount of description in the hardware description language also increases, enlarging the size of the generated circuits.

In another configuration, a microprocessor and software are combined. In this case, an arithmetic unit is shared as an instruction execution unit, and processing is executed as combinations of instructions selected by the software. Hence, the circuit size is determined by the instruction sets.

When a process requires a large number of instructions, so that it becomes difficult to generate signals at required timings, it is necessary to supplement the processing performance using parallel processing by a multiprocessor. However, it is also necessary to avoid a mechanism such as memory access arbitration or a cache memory that can cause disturbances in execution timing.

When a multiprocessor is used for executing the parallel processing, instruction execution units of the number of processor elements coexist. This causes the same problem of enlarging the circuit size. Although the circuit size can be reduced by deleting unused instructions from the instruction sets, instructions on the shared memory may be executed by any processor element in a conventional symmetric multiprocessor configuration, which limits the effectiveness.

The present disclosure provides describing hardware as fixed software on a multiprocessor, and outputting circuits of the multiprocessor system only having minimum required functions to execute the software, thereby simplifying the hardware design by alternatively designing the software; and achieving effective circuits, thus solving the above-described problems. The above-described problems are described as being independent from each other. The present disclosure does not necessarily have to be able to solve all the problems, but at least one of the problems. The inventor also has an intention of obtaining the right independently for the configurations to solve the above-described problems by means of a divisional application, an amendment and the like.

Solution to Problem (1) To solve the above-described problems, a high-level synthesis multiprocessor system of the present disclosure is configured to include: a plurality of processors; and a plurality of memory banks each assigned to one of the processors, and is configured such that: each of the processors reads an instruction code and an operand as immediate values via a memory output signal line from a corresponding one of the memory banks to perform an execution in accordance with the instruction code without using a general-purpose register; a software program to be executed is fixed; a processor to execute each instruction in the software program is uniquely identified from among the processors; and each of the processors has a function for executing an instruction that the processor is to execute out of all executable instructions in the multiprocessor system, and does not have a function for executing an instruction that the processor is not to execute.

According to the disclosure, in the high-level synthesis multiprocessor system, each of the plurality of processors executes an instruction assigned to the processor in an appropriate order. Accordingly, every time when the same software program is executed, the same processor executes a given instruction at a predetermined address or step in the software program. Since the content of the software program executed by the high-level synthesis multiprocessor system is fixed, it is possible to identify, for each processor, instructions that are not used by the processor out of executable instructions of the high-level synthesis multiprocessor system. The processors constituting each multiprocessor are not provided with functions for instructions that the processors are not to execute in order to reduce the number of functions. In other words, the high-level synthesis, in which the hardware is described as software on a multiprocessor; and multiprocessor circuits excluding unused instructions are outputted, enables sophisticated algorithms to be easily realized by almost the smallest-size circuit.

In addition, this disclosure achieves high-level synthesis in any high-level programming language in the development of compilers.

The upper limit of the circuit size can be easily estimated based on the numbers of the instruction sets and the processors. Accordingly, the circuit size will not become excessively large, even if the amount of description of the software increases. Unnecessary circuits can be deleted in accordance with the instruction coverage of each memory bank, after the software is finally fixed. These features achieve scalable designs, while avoiding rework due to the shortage of performance and resources.

(2) The high-level synthesis multiprocessor system may be configured such that: the multiprocessor system has: an input port operation instruction and/or an output port operation instruction; and a function for receiving a signal from an input port that is an interface to outside of the multiprocessor system and/or a function for outputting a signal to an output port that is an interface to the outside; the plurality of processors is configured such that a processor that executes the input port operation instruction is connected to the input port, and other processors that do not execute the input port operation instruction are not connected to the input port; and a processor that executes the output port operation instruction is connected to the output port, and other processors that do not execute the output port operation instruction are not connected to the output port.

This configuration enables the high-level synthesis multiprocessor system of the disclosure to receive signals from the input ports and/or to output signals to the output ports. These input/output ports serve as interfaces between the circuits outputted by the high-level synthesis and the outside of the system. Since a processor that does not execute the input port operation instruction is not connected to the input port; and a processor that does not execute the output port operation instruction is not connected to the output port, the circuit configuration and the like can be simplified. This is advantageous.

(3) The high-level synthesis multiprocessor system may be configured such that: only one processor of the plurality of processors executes the output port operation instruction; and the only one processor that executes the output port operation instruction is connected to the output port not via an arbitration function. For example, a processor that does not execute the output port operation instruction is not provided with the function for executing the output port operation instruction as described above, reducing the functions and circuits of the processor. If more than one processor is configured to execute the output port operation instruction, arbitration is required between the processors. In contrast, if only one processor is configured to execute the output port operation instruction as exemplified above, the output function can be deleted from the other processors; and the only one processor retaining the output function can make output without arbitration. This enables the processing to be easily executed at high speed. Further, the configuration of the system can be simplified, since no arbitration function is required.

(4) The high-level synthesis multiprocessor system may be configured such that: the system includes an initialization function for initializing each of the memory banks by initializing an operand on a program execution memory of the each of the memory banks; and the initialization function is implemented by a software program. In this configuration, in which the initialization function is executed by a software program, an initialization sequence at the time of power-on can be executed by software, reducing the circuit size.

(5) A system may be configured to include: a detection function for performing detection for all instructions constituting the software program executed by the plurality of processors of the above-described high-level synthesis multiprocessor system, to identify one of the processors to execute each instruction of the all instructions, and detect, for each processor of the processors, at least one instruction that the each processor is to execute or at least one instruction that the each processor is not to execute; and a function for determining a hardware configuration of the each processor and outputting the hardware configuration based on a detection result of the detection function. In this configuration, it is possible to output multiprocessor circuits in which unused instructions are deleted from each of the plurality of processors to execute the software program.

Advantageous Effects of Disclosure

This disclosure provides a high-level synthesis, in which hardware is described as software on a multiprocessor; and multiprocessor circuits are outputted with unused instructions deleted, enabling sophisticated algorithms to be easily realized by almost the smallest-size circuit.

DESCRIPTION OF EMBODIMENTS

Hereinafter, preferred embodiments of the present disclosure will be described in detail with reference to the accompanying drawings. However, the present disclosure is not limited to the embodiments. Various modifications, alterations, and improvements may be made based on the knowledge of those skilled in the art without departing from the scope of the present disclosure.

Figure 1:
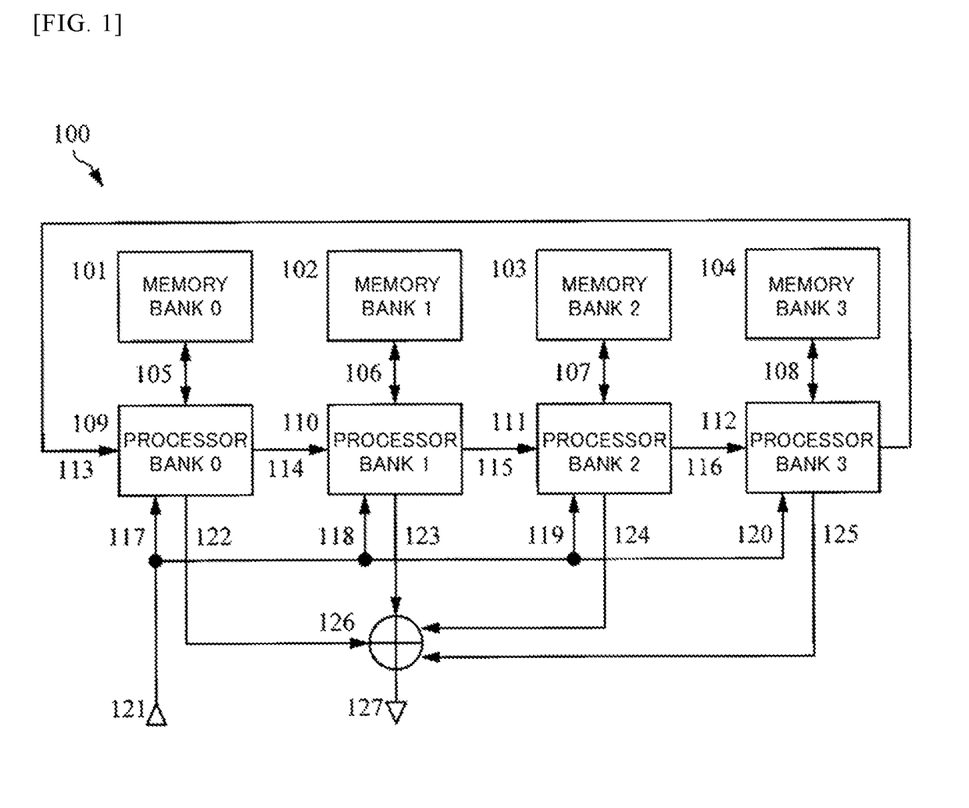
FIG. 1 is a block diagram showing a configuration of a prototype multiprocessor system 100 according to an embodiment of the present disclosure.

FIG. 1 is a block diagram showing an exemplary configuration of a prototype multiprocessor system 100, which is the premise of a high-level synthesis multiprocessor system according to the present disclosure. The prototype multiprocessor system 100 according to an embodiment of the disclosure has a four-processor configuration with four processors 109-112. The processors 109-112 have corresponding memory banks 101-104, respectively.

The memory banks 101-104 constitute a distributed shared memory, where the memory banks 101-104 hold images in areas specified by the lower 2 bits, 00, 01, 10, and 11 in address space of the entire shared memory; and the processors 109-112 simultaneously access the different memory banks.

The processors 109-112 correspond one-to-one to the memory banks 101-104, respectively. Each processor 109-112 has access only to its corresponding memory bank. Each processor 109-112 can read from or write to its corresponding memory bank independently from the processing by the other processors. The shared memory is divided in accordance with the lower bits of address into the memory banks 101-104, which are assigned to the processors 109-112, respectively. On completing execution of one instruction, the processors 109-112 transfer the control to its next processor. The processors are configured to execute instructions independently from each other and undisturbedly.

Figure 3:
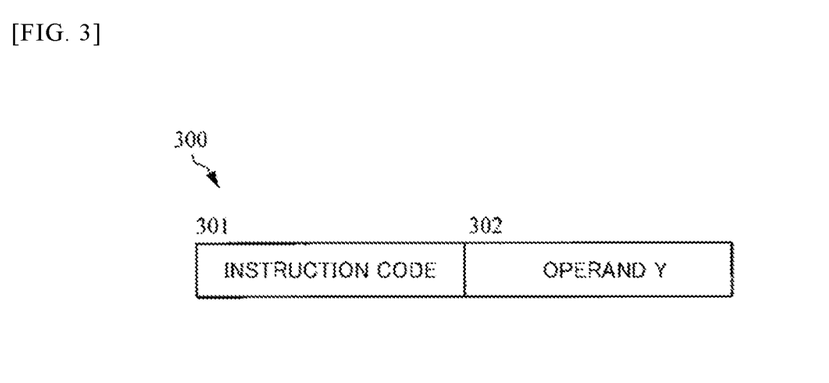
FIG. 3 is a diagram showing bit configurations of memory output data 300, an instruction code 301, and an operand Y 302 according to an embodiment of the present disclosure.

The processors 109-112 simultaneously receive an instruction code 301, and a one-word long operand 302 from the corresponding memory banks 101-104 through the memory output signals 105-108; and execute a corresponding process. FIG. 3 shows a bit configuration of memory output data 300.

Figure 4:
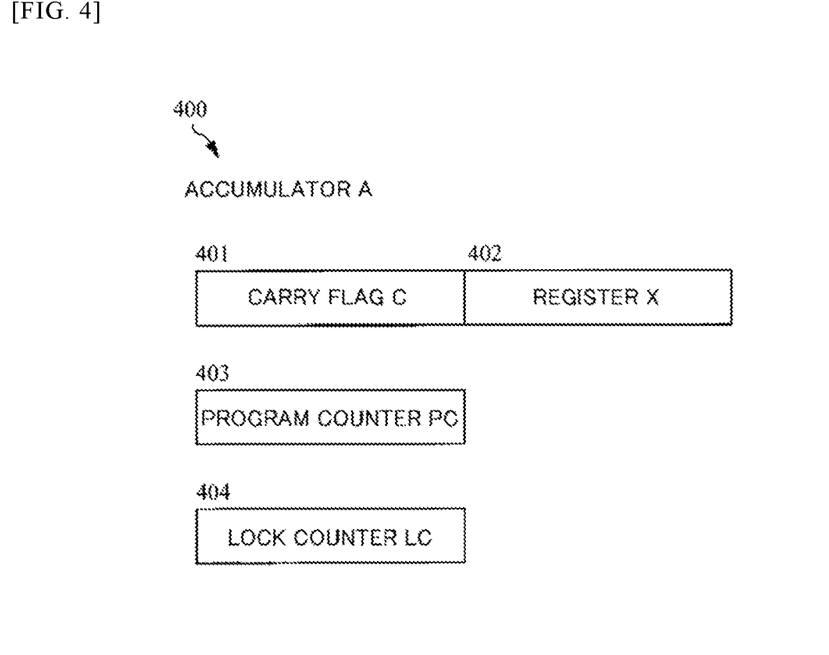
FIG. 4 is a diagram showing bit configurations of an accumulator A 400, a carry flag C 401, a register X 402, a program counter PC 403, and a lock counter LC 404 according to an embodiment of the present disclosure.

Each processor calculates in accordance with an instruction specified by the instruction code 301 by using the operand Y 302 and an accumulator A 400 as inputs. The processor reflects the result on the accumulator A 400, a program counter PC 403, and a lock counter LC 404.

Figure 6:
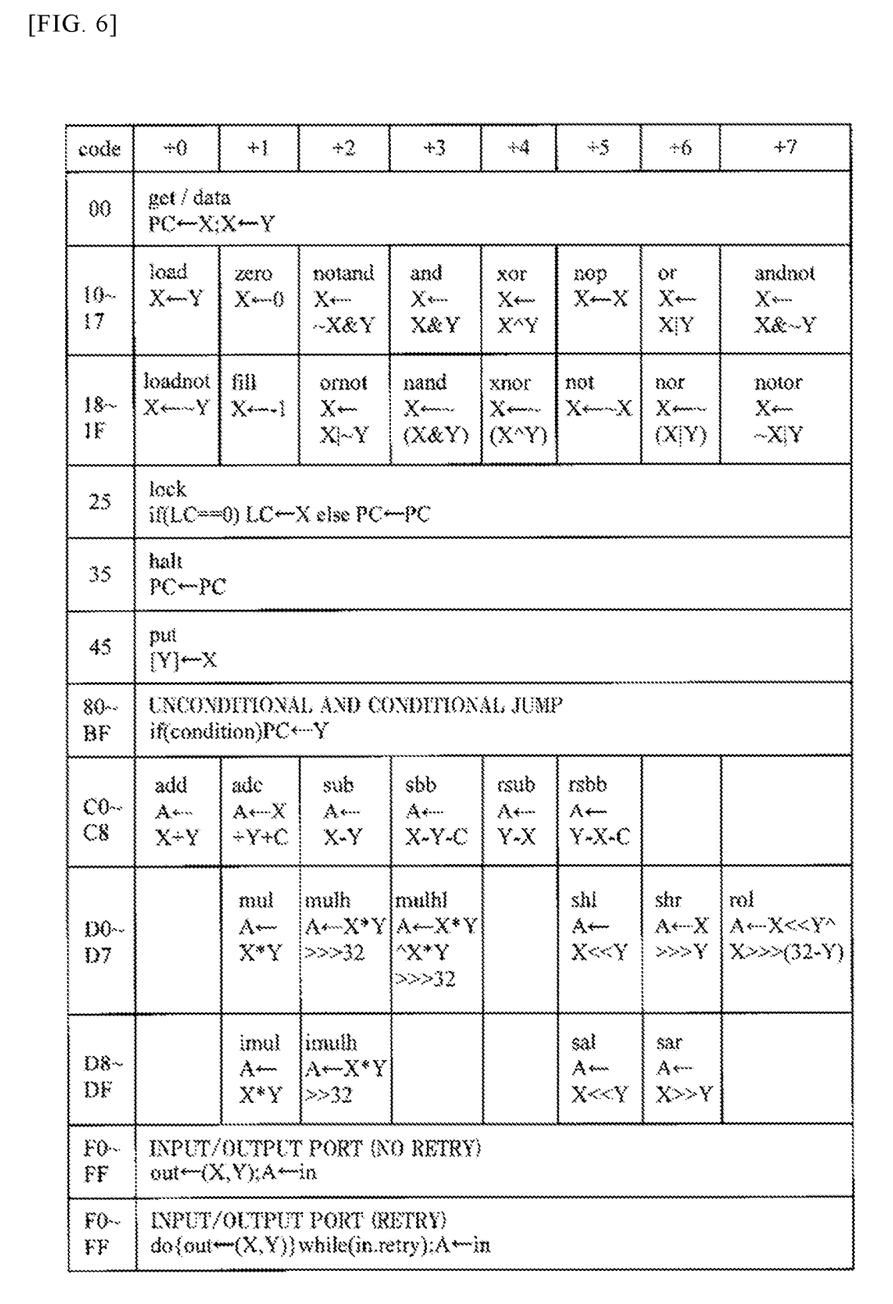
FIG. 6 is a diagram showing exemplary assignment of instruction codes, and operations of the codes according to an embodiment of the present disclosure.

The length of the instruction code 301 may be, e.g., 4 bits or 8 bits. FIG. 6 shows an exemplary instruction set when the instruction codes have a length of 8 bits. If the program counter PC 403 has no substitution as execution content, the value is incremented as PC<–PC+1.

An instruction represented by the mnemonic PUT can change the operand Y 302 at a predetermined address on the memory. Specifically, the processor replaces the operand Y 302 for an instruction at a memory address specified by the operand Y 302 at the time of execution of the PUT instruction with the value of the accumulator A 400 at the time of execution of the instruction.

If the value of the lock counter LC 404 is 0, the execution bank is unlocked, and the value can be set by a LOCK instruction. Thereafter, the execution bank remains locked during the number of cycles of the set value. When the counter value is decremented one by one to 0, the execution bank becomes unlocked again.

If the LOCK instruction is executed when the execution bank is locked, the value of the lock counter LC 404 is not set. The LOCK instruction jumps to the same address to execute a spinlock.

On completing an instruction, the processors 109-112 delegate a thread state to the processor corresponding to the next bank through thread-state delegation signals 113-116. The thread-state delegation signals 113-116 are sent through signal lines connecting the processors. On the processor that has received the thread state, the values of the accumulator A 400 and the program counter PC 403 are updated based on the execution result of the instruction. The lock counter LC 404 is bank-specific, so that the lock counter LC 404 is not delegated to the next bank.

The processors 109-112 communicate with the outside of the system via input/output ports. Signals arriving at a system input port 121 are input to input ports 117-120 of the processors, and are reflected on the accumulator A 400 as the result of an input/output port operation instruction.

Output ports 122-125 of the processors output the operand 302, the register 402, and a strobe signal only when the input/output port operation instruction is executed. The output ports 122-125 output 0, except when the input/output port operating instruction is executed.

The output ports 122-125 of the processors are combined into one output port signal by OR circuit 126. The output port signal is connected to a system output port 127. With this mechanism, the same signal as the output of the output ports 122-125 of the processors at the time of execution of the input/output port operation instruction can be output to the system output port 127, unless more than one processor simultaneously executes the input/output port operation instruction.

Figure 2:
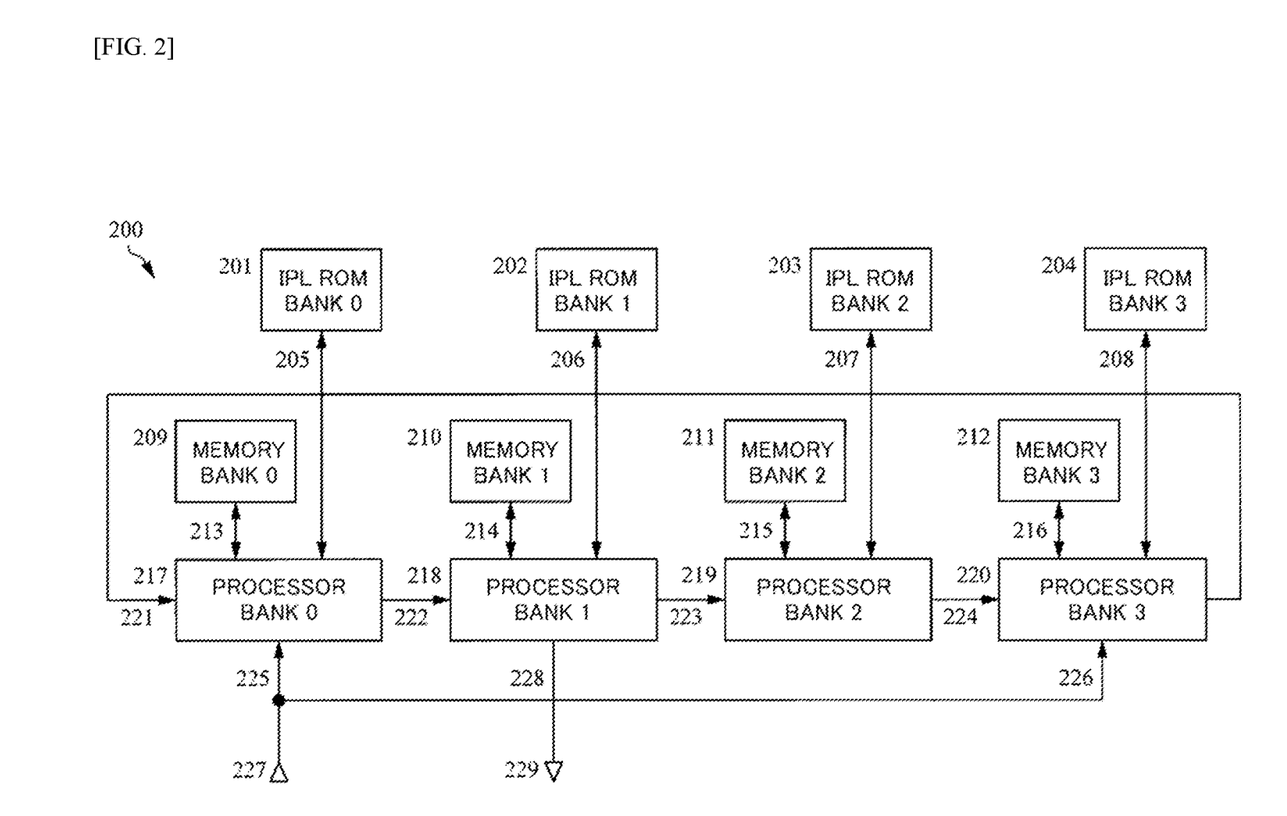
FIG. 2 is a block diagram showing a configuration of a high-level synthesis multiprocessor system 200 according to an embodiment of the present disclosure.
Figure 5:
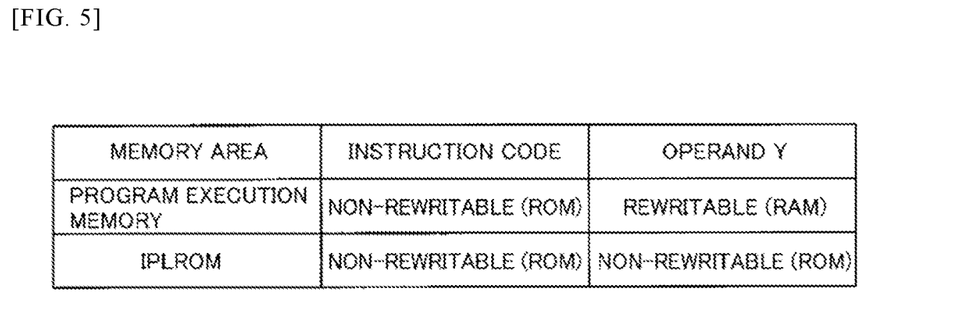
FIG. 5 is a diagram showing memory types (rewritable/non-rewritable) of memory areas in a high-level synthesis multiprocessor system according to an embodiment of the present disclosure.

FIG. 2 is a block diagram showing a preferred embodiment of a high-level synthesis multiprocessor system 200 according to the present disclosure. FIG. 5 is a diagram showing memory types (rewritable/non-rewritable) of memory areas of the high-level synthesis multiprocessor system. The high-level synthesis multiprocessor system 200 has a four-processor configuration with four processors 217-220, which is similar to the prototype multiprocessor system 100. The processors 217-220 includes program execution memories 209-212, respectively, which are memory banks corresponding to the processors 217-220.

The processors 217-220 correspond one-to-one to the program execution memories 209-212, respectively. Each processor 217-220 has access only to its program execution memory 209-212, which is the corresponding memory bank. Accordingly, each processor 217-220 can read from or write to its corresponding program execution memory independently from the processing by the other processors.

The high-level synthesis multiprocessor system 200 of the present embodiment includes a minimum number of circuits capable of executing fixed software on the memory. As shown in FIG. 5, the instruction codes 301 on the memories are non-rewritable. Accordingly, the processors are outputted as circuits limited only to these instructions for each bank.

The high-level synthesis multiprocessor system 200 of the present embodiment does not have a configuration in which one processor executes all instructions on the memory one by one in order. Instead, when one of the four processors completes execution of an instruction at a given address on the memory, the next processor receives a thread-state delegation signal and executes an instruction at a next address. The system 200 is configured such that each processor executes only one instruction in turn. In other words, the program goes around the processors in order, while having each processor execute a predetermined instruction. The processor to execute each instruction of the program is uniquely specified. The predetermined processor executes an instruction of a predetermined address or step assigned to the processor. Thus, each processor executes its own limited operation instructions.

As is apparent from comparing FIGS. 1 and 2, both of the prototype multiprocessor system 100 and the high-level synthesis multiprocessor system 200 have the four-processor configuration with the processors 109-112 and with the processors 217-220, which represents the same block diagram. However, the processors 217-220 have an internal configuration and functions different from the processors 109-112. Specifically, the processors 109 to 112 implemented in the prototype multiprocessor system 100 have functions for executing, e.g., all the instruction codes shown in FIG. 6. The four processors 109 to 112 have the same configuration.

On the other hand, the processors 217 to 220 implemented in the high-level synthesis multiprocessor system 200 of the embodiment are each customized depending on programs to execute. As described above, the high-level synthesis multiprocessor system 200 of the embodiment is configured to execute fixed software (programs). The processors execute an instruction in turn in a manner like bucket-brigade. The processor to execute an instruction at a given address described in a program is uniquely specified. No other processors execute this instruction. Thus, each processor only executes specified and limited instructions in a program. Accordingly, the processors are configured such that functions for executing instructions that the processor does not execute are deleted from the processor. For example, if a processor does not execute a multiplication instruction, multiplication function is deleted from the processor.

In a case where the high-level synthesis multiprocessor system 200 is implemented in an ASIC, the operand Y 302 of each program execution memory 209-212 can be indefinite when the power is turned on, since the operand Y 302 is in random access memory (RAM) as shown in FIG. 5. In such case, the RAM area is initialized using IPLROMs 201-204.

In a case where the high-level synthesis multiprocessor system 200 is implemented in an FPGA and the RAM can be set during configuration, or in a case where the RAM area can otherwise be initialized, the IPLROMs 201-204 and IPLROM signals 205-208 may be omitted.

To initialize the program execution memories 209-212 by using the IPLROMs 201-204, the IPLROMs and the program execution memories are allocated in the shared memory space, and the operand Y 302 on the program execution memory is initialized by executing an instruction code on the IPLROM. This configuration allows the initialization sequence at the time of power-on to be executed by software, reducing the circuit size. Since the initialization can be implemented by software, only the memory area for the initialization code is consumed. Such memory area can be reused for operation after the initialization.

The initialization sequence code on the IPLROM can be constituted only of a LOAD instruction for setting the accumulator A 400, a PUT instruction for setting the operand Y 302 of the program execution memory area, and an instruction for jumping to the program execution memory after completing the initialization sequence.

Bus wiring in the high-level synthesis results is also optimized depending on coverage status of the input/output port operation instruction in each bank. In the prototype multiprocessor system 100 shown in FIG. 1, signals arriving at the input port 121 is connected to the input ports 117-120 of all the processors 109-112. On the other hand, the high-level synthesis multiprocessor system 200 has a configuration in which, when only the banks, e.g., 0 and 3 read the input ports, the input port signal 227 is connected only to the input ports 225, 226 of the processors 217, 220 corresponding to the banks 0, 3; and the input port signal 227 is not connected to the processors 218, 219.

Similarly, in the prototype multiprocessor system 100, the output ports 122-125 of all the processors 109-112 are connected to an OR circuit 126, and an output of the OR circuit 126 is connected to an output port 127. On the other hand, the high-level synthesis multiprocessor system 200 has a configuration in which, when only the processor, e.g., 218 of the bank 1 operates the output port, the OR circuit is omitted; the output port 228 of the processor 218 is directly connected to an external output port 229; and the other processors are not connected to the external output port 229.

When a system is configured such that all the processors make output, arbitration is required between the processors. However, as in the example above, when only one processor is set to make output, the output function can be deleted from the other processors, and the processor retaining the output function can make output without arbitration with the other processors.

Further, in the high-level synthesis multiprocessor system 200 in which a multiprocessor architecture is implemented as described above, the shared memory is divided into the plurality of banks in accordance with the lower bits of address; and each bank is connected to its specific processor element. The processors of the banks corresponding to the neighboring addresses are connected to each other through the bus wiring for delegating the thread state including the register value and the program counter value, forming a circular connection structure as a whole. All the processor elements execute an instruction simultaneously in the same cycle, and delegate the execution result to the next processor element. This mechanism enables the same number of threads as the processor elements to be executed in parallel.

Each processor element reads an instruction code at an address indicated by the program counter from its connected memory bank, and executes the operation in accordance with the instruction code by using an arithmetic unit provided in the processor. On completing the execution of the operation, the processor element transmits the register value and the program counter value of the operation result to the next processor element to delegate the thread state.

In a case of instructions such as an arithmetic or logical operation without program counter control, the program counter value is incremented, so that the lower bits of the program counter value coincide with the lower bits of the bank-assigning address of the next processor.

When the lower bits of the program counter value do not coincide with the lower bits of the bank-assigning address due to a jump instruction or the like, the thread is paused, and no instruction is executed. The thread is delegated to the next processor in the previous state. When the lower bits of the program counter value coincide with the lower bits of the bank-assigning address as the result of the delegation, the thread resumes to execute the instruction.

Figure 7:
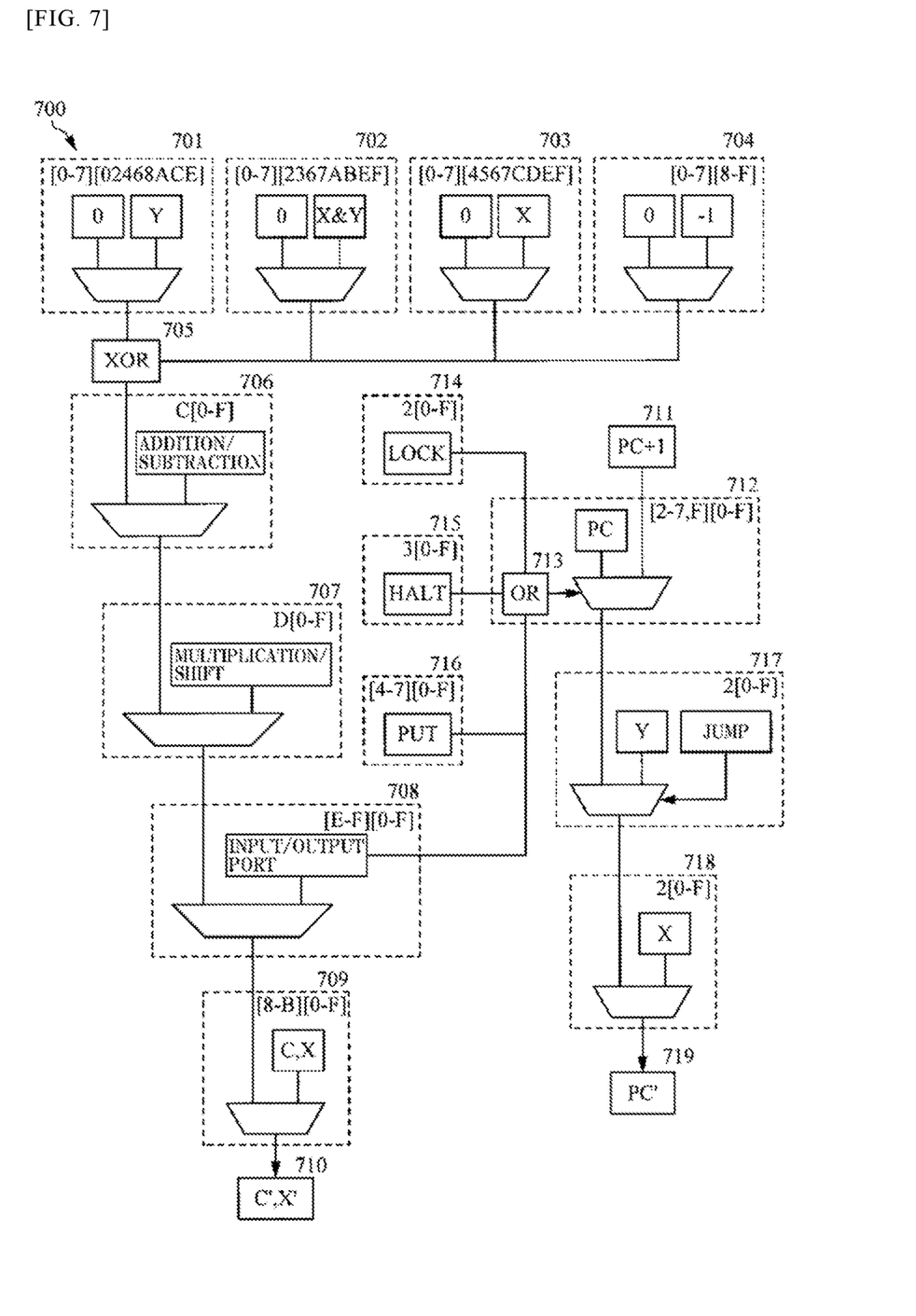
FIG. 7 is a block diagram showing instruction processing circuits according to an embodiment of the present disclosure.

FIG. 7 is a block diagram showing exemplary instruction processing circuits used in an embodiment of the present disclosure. The instruction processing circuits are implemented, e.g., in the processors 109-112 of the prototype multiprocessor system 100. As will be described below, some circuit elements are omitted or simplified in the processors 217-220 of the high-level synthesis multiprocessor system 200. The logic operation instruction updates the value of the register X 402 by the combination of the operand Y 302, the register X402, the logical AND X & Y, and all bit inversion in accordance with the value of the lower 4 bits of an instruction code. In the logic operation instruction, the value of the carry flag C 401 is retained.

In a GET/DATA instruction, the value of the operand Y 302 is substituted into the register X 402. In a LOCK instruction, a HALT instruction, and a PUT instruction, the value of the register X402 is retained. These processes are also executed by the same circuit as the logical operation instruction. In instructions of instruction codes 00 to 7F, the update value of the accumulator A 400 is calculated by the same circuit as the logical operation instruction.

A logic-operation-instruction Operand Y selection circuit 701 outputs the value of the operand Y 302, when the low digit of an instruction code is any of 0, 2, 4, 6, 8, A, C, E in hexadecimal notation. Otherwise, the circuit 701 outputs 0. In the high-level synthesis multiprocessor system 200, if the memory of the same bank contains no instruction code of which high order digit is 0-7 in hexadecimal notation and of which low order digit is any of 0, 2, 4, 6, 8, A, C, E, the logic-operation-instruction Operand Y selection circuit 701 is simplified to a circuit that always outputs only 0.

A logic-operation-instruction AND of Register X and Operand Y selection circuit 702 outputs the value of the logical AND of the register X 402 and the operand Y 302, if the low digit of an instruction code is any of 2, 3, 6, 7, A, B, E, F in hexadecimal notation. Otherwise, the circuit 702 outputs 0. In the high-level synthesis multiprocessor system 200, if the memory of the same bank contains no instruction code of which high order digit is 0-7 in hexadecimal notation and of which low order digit is any of 2, 3, 6, 7, A, B, E, F, the Logic-operation-instruction AND of Register X and Operand Y selection circuit 702 is simplified to a circuit that always outputs only 0.

A logic-operation-instruction Register X selection circuit 703 outputs the value of the register X 402, if the low digit of an instruction code is any of 4, 5, 6, 7, C, D, E, F in hexadecimal notation. Otherwise, the circuit 703 outputs 0. In the high-level synthesis multiprocessor system 200, if the memory of the same bank contains no instruction code of which high order digit is 0-7 in hexadecimal notation and of which the low order digit is any of 4, 5, 6, 7, C, D, E, F, the logic-operation-instruction Register X selection circuit 703 is simplified to a circuit that always outputs only 0.

A logic-operation-instruction Bit inversion selection circuit 704 outputs −1, if the low digit of an instruction code is any of 8-F in hexadecimal notation. Otherwise, the circuit 704 outputs 0. In the high-level synthesis multiprocessor system 200, if the memory of the same bank contains no instruction code of which high order digit is 0-7 in hexadecimal notation and of which low order digit is 8-F, the logic-operation-instruction Bit inversion selection circuit 704 is simplified to a circuit that always outputs only 0.

A logic instruction exclusive OR output circuit 705 calculates the exclusive OR of the outputs of the logic-operation-instruction Operand Y selection circuit 701, the logic-operation-instruction AND of Register X and Operand Y selection circuit 702, the logic-operation-instruction Register X selection circuit 703, and the logic-operation-instruction Bit inversion selection circuit 704; adds the carry flag C401; and outputs the update value of the accumulator A 400 by the logic operation instruction.

An addition/subtraction instruction selection circuit 706 outputs the update value of the accumulator A 400 by the addition/subtraction instruction, if an instruction code is C0-CF in hexadecimal notation. Otherwise, the circuit 706 passes the output of the logic instruction exclusive OR output circuit 705. In the high-level synthesis multiprocessor system 200, if the memory of the same bank contains no instruction code that is C0-CF in hexadecimal notation, the addition/subtraction instruction selection circuit 706 is simplified to a circuit that always passes the output of the logic instruction exclusive OR output circuit 705.

A multiplication/shift instruction selection circuit 707 outputs the update value of the accumulator A 400 by the multiplication/shift instruction, if an instruction code is D0-DF in hexadecimal notation. Otherwise, the circuit 707 passes the output of the addition/subtraction instruction selection circuit 706. In the high-level synthesis multiprocessor system 200, if the memory of the same bank contains no instruction code that is D0-DF in hexadecimal notation, the multiplication/shift instruction selection circuit 707 is simplified to a circuit that always passes the output of the addition/subtraction instruction selection circuit 706.

In the high-level synthesis multiprocessor system 200, if the memory of the same bank contains no instruction code for a multiplication instruction, but contains an instruction code for a shift instruction, the operation in the multiplication/shift instruction selection circuit 707 is alternatively executed in a barrel shifter configuration of lighter weight. If the memory of the same bank contains both the instruction codes for the multiplication instruction and for the shift instruction, the operation of the shift instruction is executed using the multiplication circuit.

An input/output port instruction selection circuit 708 outputs the update value of the accumulator A 400 by the input/output port instruction and a retry signal, if an instruction code is E0-FF in hexadecimal notation. Otherwise, the circuit 708 passes the output of the multiplication/shift instruction selection circuit 707, and outputs 0 as the retry signal. In the high-level synthesis multiprocessor system 200, if the memory of the same bank contains no instruction code that is E0-FF in hexadecimal notation, the input/output port instruction selection circuit 708 is simplified to a circuit that always passes the output of the multiplication/shift instruction selection circuit 707, and outputs 0 as the retry signal.

When the input/output port instruction selection circuit 708 is configured to switch ports in accordance with the low bit of the instruction code, the selection circuit is subdivided for each port. In the high-level synthesis multiprocessor system 200, whether the memory of the same bank contains an instruction code is determined for each port. When the memory contains no instruction code, the circuit is similarly simplified.

An accumulator retention selection circuit for jump instruction 709 outputs the old value of the accumulator A 400, if the instruction code is 80-BF in hexadecimal notation. Otherwise, the circuit 709 passes the output of the input/output port instruction selection circuit 708. In the high-level synthesis multiprocessor system 200, if the memory of the same bank contains no instruction code that is 80-BF in hexadecimal notation, the accumulator retention selection circuit for jump instruction 709 is simplified to a circuit that always passes the output of the input/output port instruction selection circuit 708.

The output of the accumulator retention selection circuit for jump instruction 709 is connected to the processor element of the neighboring bank, as an accumulator output after instruction execution 710.

A program counter increment circuit 711 calculates a value by adding 1 to the program counter PC 403.

A LOCK instruction processing circuit 714 executes a LOCK instruction, if an instruction code is 20-2F in hexadecimal notation; and outputs a retry signal 1 when the lock acquisition failed. In the high-level synthesis multiprocessor system 200, if the memory of the same bank contains no instruction code that is 20-2F in hexadecimal notation, the LOCK instruction processing circuit 714 is simplified to a circuit that always outputs a retry signal 0.

A HALT instruction processing circuit 715 executes a HALT instruction, if an instruction code is 30-3F in hexadecimal notation; and outputs a retry signal 1. In the high-level synthesis multiprocessor system 200, if the memory of the same bank contains no instruction code that is 30-3F in hexadecimal notation, the HALT instruction processing circuit 715 is simplified to a circuit that always outputs a retry signal 0.

A PUT instruction processing circuit 716 executes a PUT instruction, if an instruction code is 40-7F in hexadecimal notation; and outputs a retry signal 1 in the event of write-back collision. In the high-level synthesis multiprocessor system 200, if the memory of the same bank contains no instruction code that is 40-7F in hexadecimal notation, the PUT instruction processing circuit 716 is simplified to a circuit that always outputs a retry signal 0.

A retry signal OR circuit 713 calculates the logical OR of the outputs of the LOCK instruction processing circuit 714, the HALT instruction processing circuit 715, the PUT instruction processing circuit 716, and the input/output port instruction selection circuit 708; and inputs a retry signal in the retry signal processing selection circuit 712.

If the retry signal outputted by the retry signal OR circuit 713 is 1, the retry signal processing selection circuit 712 outputs the old value of the program counter PC 403. Otherwise, the circuit 712 passes the output of the program counter increment circuit 711. In the high-level synthesis multiprocessor system 200, if the memory of the same bank contains no instruction code that is 20-7F or F0-FF in hexadecimal notation, the retry signal processing selection circuit 712 including the retry signal OR circuit 713 is simplified to a circuit that passes the output of the program counter increment circuit 711.

A JUMP instruction processing circuit 717 determines a jump condition, if an instruction code is 80-BF in hexadecimal notation. When the condition is satisfied, the circuit 717 outputs the value of the operand Y 302. Otherwise, the circuit 717 passes the output of the retry signal processing selection circuit 712. In the high-level synthesis multiprocessor system 200, if the memory of the same bank contains no instruction code that is 80-BF in hexadecimal notation, the JUMP instruction processing circuit 717 is simplified to a circuit that passes the output of the retry signal processing selection circuit 712.

A jump destination selection circuit for GET/DATA instruction 718 outputs the value of the register X402, if an instruction code is 00-0F in hexadecimal notation. Otherwise, the circuit 718 passes the output of the JUMP instruction processing circuit 717. In the high-level synthesis multiprocessor system 200, if the memory of the same bank contains no instruction code that is 00-0F in hexadecimal notation, the jump destination selection circuit for GET/DATA instruction 718 is simplified to a circuit that passes the output of the JUMP instruction processing circuit 717.

The output of the jump destination selection circuit for GET/DATA instruction 718 is connected to the processor element of the neighboring bank as a program counter output after instruction execution 719.

Figure 8:
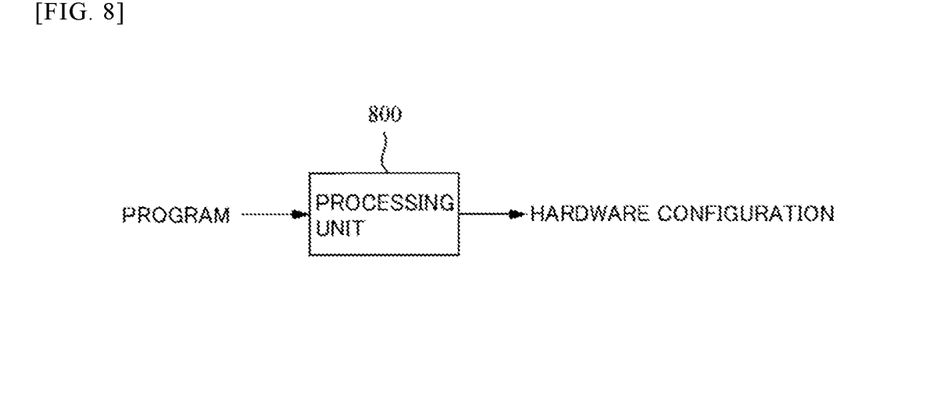
FIG. 8 is a diagram showing an exemplary system for performing high-level synthesis.

The hardware configuration of the processors 217-220 constituting the above-described high-level synthesis multiprocessor system 200 is created by, e.g., a processing unit 800 shown in FIG. 8. The processing unit 800 is provided with the program executed by the high-level synthesis multiprocessor system 200.

The processing unit 800 checks descriptions of steps of the inputted program sequentially from the top; and executes the following processing each time.

(1) The processing unit 800 identifies a processor to execute an instruction of each step in accordance with the number of the step.

(2) The processing unit 800 firstly extracts an instruction code of the step to be processed. In accordance with the extracted hexadecimal notation, the processing unit 800 sets a flag on a predetermined execution instruction of an execution instruction list associated with the processor identified in (1). More specifically, the processing unit 800 stores the execution instruction list for each processor, in which the flagged instructions are associated with all executable execution instructions shown in FIGS. 6 and 7. Initial values of the flagged instructions are all set to 0. The processing unit executes the above-described processing; and sets a flag on the corresponding execution instruction, setting the value to 1.

For example, the processor unit identifies which processor among the processors 217-220 (the banks 0-3) is to execute the step in accordance with the number of the step to be processed. For example, in the case where the processor 217 (the bank 0) is to execute the step, the processor unit sets a flag on the desired instruction in the execution instruction list associated with the processor of the bank 0. For example, when the instruction code is D0 to DF in hexadecimal notation, the desired execution instruction is a "multiplication/shift instruction." When the instruction code is C0 to CF in hexadecimal notation, the desired execution instruction is an "addition/subtraction instruction."

(3) The processing unit repeats the processes (1) and (2) until the last step. When the processing unit completes the processes for all the steps, the processors to execute each instruction are identified. The processing unit 800 creates, for each processor, information (hardware configuration) that specifies "instructions to execute" and/or "instructions not to execute", and outputs the information. This output function of the hardware configuration includes, for example, printing out the written information or displaying the information.

Figure 9:
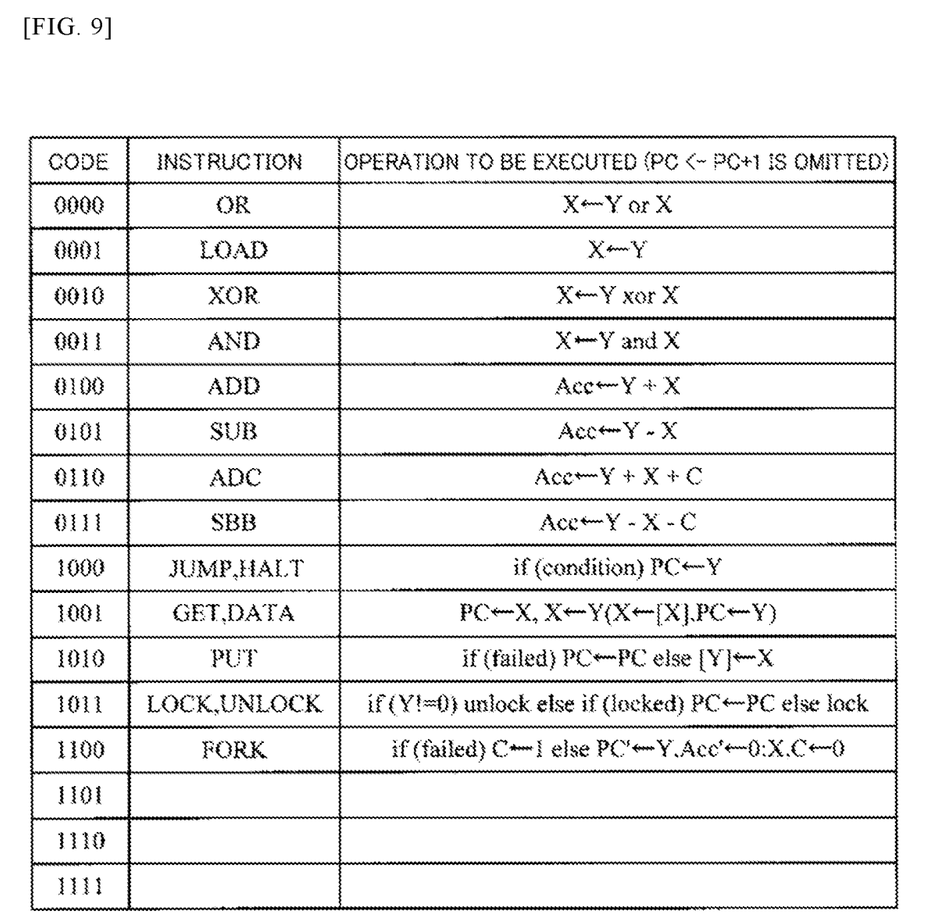
FIG. 9 is a diagram showing exemplary assignment of instruction codes (4 bits) and operations of the codes according to an embodiment of the present disclosure.

In the embodiment described above, the code length of instructions executed by the prototype multiprocessor system 100 and by the high-level synthesis multiprocessor system 200 generated based on the prototype multiprocessor system 100 is set to 8 bits as shown in FIG. 6. However, the present disclosure is not limited to this setting. For example, the length of the instruction codes may be 4 bits or any other number of bits. FIG. 9 shows an exemplary instruction set in the case of the code length of 4 bits. A multiprocessor system using the exemplified 4-bit instruction set will be described below.

As shown in FIG. 4, the accumulator 400 includes the one-word long register 402 and the carry flag 401 that is higher than the register 402. Logic operations are executed only on the register 402; and additions and subtractions are executed on the entire accumulator including the carry flag. The carry flag is also used to notify a result of execution of a special instruction, or is used as a condition when executing a conditional jump instruction.

In operation instructions, a binary operation is executed between the accumulator and the operand; and the result of the operation is sent to the next processor through an accumulator signal, and is reflected as a new value of the accumulator.

The operand 302 is read by the processor as an immediate value at the same time as the instruction code 301, so that the instruction can be executed immediately without overhead for register file access. Since distinction between immediate values and register accesses is not required, the number of necessary codes is significantly reduced. Basic instructions can be covered even in 4 bits as in this embodiment (see FIG. 9).

Figure 10:
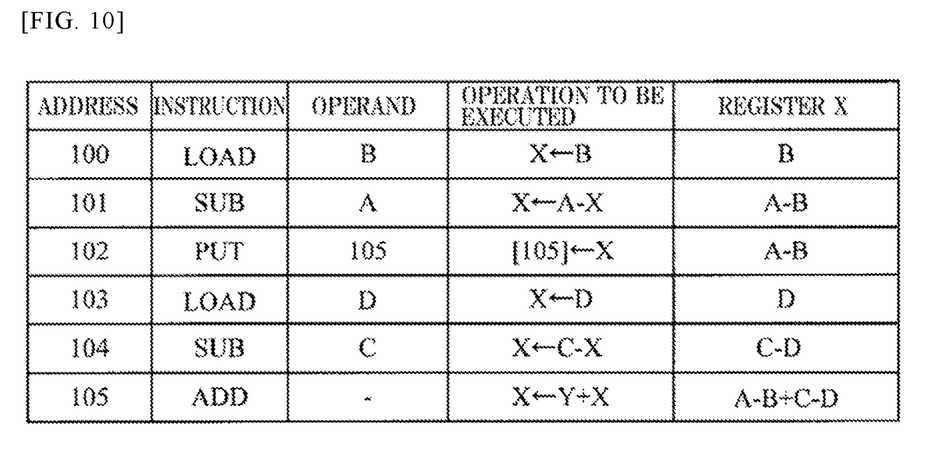
FIG. 10 is a diagram showing exemplary code strings constituting an operation tree.

By rewriting the operand 301 on the memory in advance before reading, a predetermined operand can be used as a general-purpose register. This function can be obtained by implementing a PUT instruction for executing a random access write to rewrite the operand 302 stored in the memory at the address specified by the operand 302 with the value of the register 402. This instruction can construct a predetermined operation tree. FIG. 10 shows exemplary code strings for calculating (A−B)+(C−D).

Random access writes do not detract from the memory consistency within a thread, even if a random access write is delayed until a memory read from the same bank. Hence, as such write signals, bank 0 write signals 105, 213; bank 1 write signals 106, 214; bank 2 write signals 107, 215; and bank 3 write signals 108, 216 hold write addresses, data, and enable signals. The write signals are transferred between the processors in parallel with the internal state of the processor.

Each write signal executes a write-back process to the bank memory upon arriving at its target bank.

When a fetch and a write-back of an instruction and an operand are executed to the same address, data written by the write-back is configured to be immediately read as the instruction and the operand. With this configuration, a write to an address immediately after the instruction is reflected before the next fetch. The next fetch can be executed without any problem. When a dual port memory in a FPGA is used, the result of simultaneous read and write to the same address from different ports may be indefinite. This problem can be avoided by implementing at least one bypass circuit around the memory.

When the write signal input of the target bank is already enabled at the time of execution of the random access write instruction, the execution of the write instruction is temporarily paused and a jump to the same address is executed to retry the write instruction. Since the write-back is also executed during rotation waiting time for the jump instruction, all the write-backs have already been executed before the retry. No write collision occurs. A write retry receives a penalty of four instructions. Such write retries can be prevented by avoiding consecutive writes to the same bank during compilation, and prioritizing a write to a bank to which a write-back is to be executed immediately after the write.

Intentionally executing consecutive writes to the same address causes write collision. During the resultant rotation waiting, all write-backs to the same thread can be executed, fixing the content of the memory in relation to the other threads. This can be utilized as a memory barrier in inter-thread communication.

In random access writing, the higher 4 bits of the operand 302 specifying the address can be used for writing an instruction code. Specifically, when the address of the memory space can be expressed within the number of bits obtained by subtracting four from the word length, the value of the higher 4 bits of the operand is simultaneously written to the instruction code memory 301 during the write-back. An instruction code of a write destination address is already determined at compilation time, and an address with an instruction code is fixed prior to the execution, requiring no overhead during the execution. This is effective for concurrent atomic rewriting of the instruction code and the operand in inter-thread communication.

Due to write-back delays in random-access writes, the consistency of the memory is usually not maintained between different threads. However, a LOCK instruction can be used to achieve secure inter-thread communication. A LOCK instruction is an instruction that operates a mutex assigned to a processor to execute an instruction. If the processor is already locked, a jump to the same address is executed, performing a spinlock. On the other hand, if the processor is successfully locked, the processor becomes locked and holds the locked state until an UNLOCK instruction is executed. Whether the processor is locked only affects the LOCK instruction, but does not affect executions of the other instructions.

The UNLOCK instruction has the same instruction code as the LOCK instruction, but these instructions are distinguished from each other by the operand values. The operand of the LOCK instruction is set to 0 to execute a lock of the mutex of the processor bank that executed the instruction. The operand of the UNLOCK instruction specifies, by the lower 4 bits, the bank of the processor to be unlocked. The UNLOCK instruction can be executed by any processor bank. When more than one UNLOCK instruction is concurrently executed, all the parameters are ORed, and the unlock is notified to each processor bank. This notification is made through the unlock signaling bus.

Figure 11:
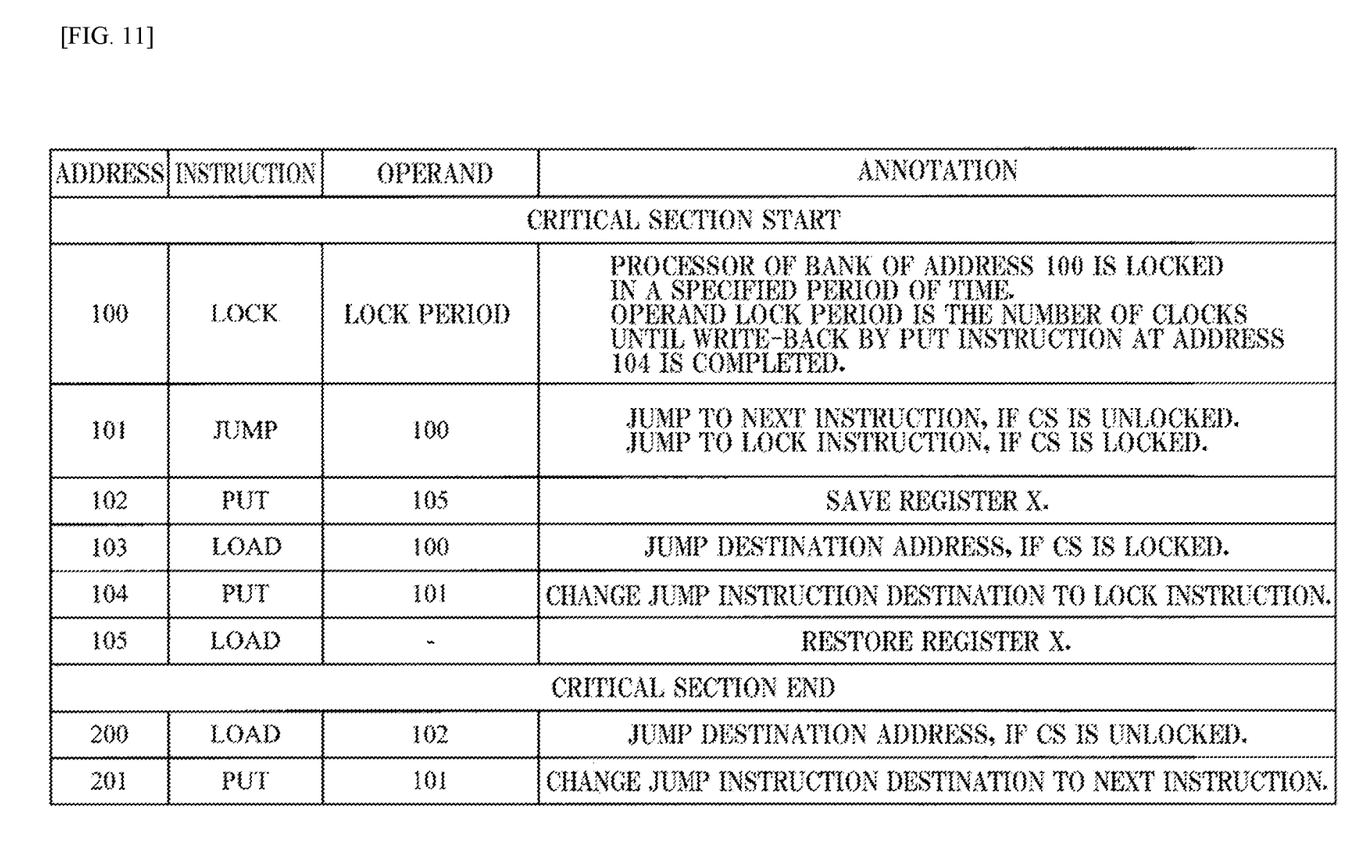
FIG. 11 is a diagram showing exemplary implementation of a critical section using a LOCK instruction.

Locking by a LOCK instruction is a coarse mutex assigned to each processor. Hence, locking by a LOCK instruction is preferably used only for a short-term locking during state transition when applied to critical sections and the like, where a certain long-term lock is required. Limiting a LOCK instruction to a lock in a fixed-period of the number of clocks specified by the operand can omit an UNLOCK instruction. FIG. 11 shows an exemplary configuration of a critical section using a LOCK instruction.

A new thread is created by a FORK instruction. To create a thread, the startup address and the initial accumulator value of a new thread are registered in a startup queue of the processor. If the queue is full, the thread creation fails. The success or failure of the thread creation is notified by a carry flag, so that a retry and a waiting queue can be configured by software. In this case, the length of a hardware waiting queue may be set to 1, thereby reducing the circuit size.

If the processor is stopped and the startup queue is not empty, a new thread is created. Specifically, the startup address and the initial accumulator value at the head of the queue are substituted into the program counter and the accumulator in the processor, allowing the processor to transition to a running state.

All threads of the same number as that of the processors may be set to be activated at the time of power-on. In this configuration, a thread pool can be implemented by software in a mechanism similar to the critical section, thereby omitting the FORK instruction. When dynamic creation of threads is not required, surplus threads can be made dormant by a HALT instruction or the like.

When data structures such as arrays, structures, and stacks are used, processing of random access read from the memory is required. This processing can be executed by a GET instruction and a DATA instruction. These instructions execute the same operation, and use the same instruction code. The GET instruction executes a jump to the address specified by the register X, and substitutes the operand Y to the register X. If the address specified by the register X contains a DATA instruction, the DATA instruction executes a jump to the address specified by the register X and substitutes the operand Y to the register X in the same way as the GET instruction. Since the value of the register X at the time of executing the DATA instruction is the value of the operand Y of the GET instruction, the GET instruction as a whole is an instruction for substituting the operand Y value of the DATA instruction at the address specified by the register X into the register X and for jumping to the address specified by the operand Y of the GET instruction.

Data-only memories and memory-mapped I/O can be used by adding the DATA instruction as an instruction code at the time of reading. Specifically, connecting the memory and peripheral circuits only to a specific processor can omit a circuit for arbitration in concurrent accesses.

Even in a multiprocessor system that supports such 4-bit instruction codes, fixing a program to be executed by the high-level synthesis multiprocessor system 200 enables a processor to execute each step in the program to be uniquely identified. Hence, while each processor of the prototype multiprocessor system 100 has the functions for executing all the instructions shown in FIG. 9 and the like, each processor of the high-level synthesis multiprocessor system 200 is configured to only retain the resultant functions of deleting the functions for instructions that the processor does not execute from all the functions of the prototype processor.

As described above, regardless of the number of bits of instruction codes, the high-level synthesis multiprocessor system 200 can have a simpler configuration than the prototype multiprocessor system 100. The 4-bit configuration described above only includes limited instructions. For example, it does not include a multiplication instruction. Since the 4-bit configuration inherently includes a small number of instructions, the reduction effect could be limited. However, in the above-described configuration of 8-bit instructions, the number of instructions is large, so that higher reduction effect can be expected. The 8-bit configuration may be more preferable.

Employing the 8-bit configuration to add instructions codes for a multiplication instruction and other instructions to the 4-bit configuration, which includes limited instructions, also increases the number of functions executed by each processor. If all the processors of the high-level synthesis multiprocessor system 200 are provided with the functions corresponding to all the instructions as in the prototype multiprocessor system 100, the circuit size becomes large. Retaining the functions for the instructions that the processors of the system 200 do not use merely enlarges the circuit size, merely resulting in demerits. To avoid the disadvantages, it is preferable to specify instructions that a processor is to execute or not to execute; and delete the executions of the instructions not to execute, thereby achieving a minimum required compact circuit. Instruction codes including "floating-point operations" further enhance the reduction effect, although specific figures are omitted herein.

Various aspects of the present disclosure have been described above with reference to the embodiments and modifications. However, these embodiments and descriptions are not intended to limit the scope of the present disclosure, but to help the understanding of the present disclosure. The scope of the present disclosure is not limited to the configurations and manufacturing methods explicitly described herein, and combinations of various aspects of the disclosure herein are also included within the scope of the present disclosure. Configurations of the present disclosure for which a patent is sought are specified in the appended claims. Further, any configuration that is disclosed herein but is not currently specified in the claims may be claimed in the future.

REFERENCE SIGNS LIST

100 prototype multiprocessor system,
101-104 memory (bank 0-3),
105-108 memory input/output signal,
109-112 processor (bank 0-3),
113-116 thread-state delegation signal,
117-120 input port (bank 0-3),
121 input port (system),
122-125 output port (bank 0-3),
126 OR circuit,
127 output port (system),
200 high-level synthesis multiprocessor system,
201-204 IPLROM (bank 0-3),
205-208 IPLROM signal,
209-212 memory (bank 0-3),
213-216 memory input/output signal,
217-220 processor (bank 0-3),
221-224 thread-state delegation signal,
225-226 input port (bank 0, 3),
227 input port (system),
228 output port (bank 1),
229 output port (system),
300 memory output data,
301 instruction code,
302 operand Y,
400 accumulator A,
401 carry flag C,
402 register X,
403 program counter PC,
404 lock counter LC,
700 instruction processing circuit block,
701 logic-operation-instruction Operand Y selection circuit,
702 logic-operation-instruction AND of Register X and Operand Y selection circuit,
703 logic-operation-instruction Register X selection circuit,
704 logic-operation-instruction Bit inversion selection circuit,
705 logic-operation-instruction exclusive OR output circuit,
706 addition/subtraction instruction selection circuit,
707 multiplication/shift instruction selection circuit,
708 input/output port instruction selection circuit,
709 accumulator retention selection circuit for jump instruction,
710 accumulator output after instruction execution,
711 program counter increment circuit,
712 retry signal processing selection circuit,
713 retry signal generation OR circuit,
714 LOCK instruction processing circuit,
715 HALT instruction processing circuit,
716 PUT instruction processing circuit,
717 JUMP instruction processing circuit,
718 jump destination selection circuit for GET/DATA instruction,
719 program counter output after instruction execution.

The invention claimed is:

1. A high-level synthesis multiprocessor system, comprising:
a plurality of processors; and
a plurality of memory banks each assigned to one of the processors, wherein
each of the processors reads an instruction code and an operand as immediate values via a memory output signal line from a corresponding one of the memory banks to perform an execution in accordance with the instruction code without using a general-purpose register,
a software program to be executed is fixed,
a processor to execute each instruction in the software program is uniquely identified from among the processors, and
each of the processors has a function for executing an instruction that the processor is to execute out of all executable instructions in the multiprocessor system, and does not have a function for executing an instruction that the processor is not to execute.

2. The high-level synthesis multiprocessor system according to claim 1, wherein
the multiprocessor system has: an input port operation instruction and/or an output port operation instruction; and a function for receiving a signal from an input port that is an interface to outside of the multiprocessor system and/or a function for outputting a signal to an output port that is an interface to the outside,
the plurality of processors is configured such that a processor that executes the input port operation instruction is connected to the input port, and other processors that do not execute the input port operation instruction are not connected to the input port, and a processor that executes the output port operation instruction is connected to the output port, and other processors that do not execute the output port operation instruction are not connected to the output port.

3. The high-level synthesis multiprocessor system according to claim 2, wherein only one processor of the plurality of processors executes the output port operation instruction, and the only one processor that executes the output port operation instruction is connected to the output port not via an arbitration function.

4. The high-level synthesis multiprocessor system according to claim 1, comprising:

an initialization function for initializing each of the memory banks by initializing an operand on a program execution memory of the each of the memory banks, wherein the initialization function is implemented by a software program.

5. A system, comprising:

a detection function for performing detection for all instructions constituting the software program executed by the plurality of processors of the high-level synthesis multiprocessor system according to claim 1, to identify one of the processors to execute each instruction of the all instructions, and detect, for each processor of the processors, at least one instruction that the each processor is to execute or at least one instruction that the each processor is not to execute; and a function for determining a hardware configuration of the each processor and outputting the hardware configuration based on a detection result of the detection function.

6. The high-level synthesis multiprocessor system according to claim 2, comprising:

an initialization function for initializing each of the memory banks by initializing an operand on a program execution memory of the each of the memory banks, wherein the initialization function is implemented by a software program.

7. The high-level synthesis multiprocessor system according to claim 3, comprising:

an initialization function for initializing each of the memory banks by initializing an operand on a program execution memory of the each of the memory banks, wherein the initialization function is implemented by a software program.

8. A system, comprising:

a detection function for performing detection for all instructions constituting the software program executed by the plurality of processors of the high-level synthesis multiprocessor system according to claim 2, to identify one of the processors to execute each instruction of the all instructions, and detect, for each processor of the processors, at least one instruction that the each processor is to execute or at least one instruction that the each processor is not to execute; and a function for determining a hardware configuration of the each processor and outputting the hardware configuration based on a detection result of the detection function.

9. A system, comprising:

a detection function for performing detection for all instructions constituting the software program executed by the plurality of processors of the high-level synthesis multiprocessor system according to claim 3, to identify one of the processors to execute each instruction of the all instructions, and detect, for each processor of the processors, at least one instruction that the each processor is to execute or at least one instruction that the each processor is not to execute; and a function for determining a hardware configuration of the each processor and outputting the hardware configuration based on a detection result of the detection function.

10. A system, comprising:

a detection function for performing detection for all instructions constituting the software program executed by the plurality of processors of the high-level synthesis multiprocessor system according to claim 4, to identify one of the processors to execute each instruction of the all instructions, and detect, for each processor of the processors, at least one instruction that the each processor is to execute or at least one instruction that the each processor is not to execute; and a function for determining a hardware configuration of the each processor and outputting the hardware configuration based on a detection result of the detection function.

11. A system, comprising:

a detection function for performing detection for all instructions constituting the software program executed by the plurality of processors of the high-level synthesis multiprocessor system according to claim 6, to identify one of the processors to execute each instruction of the all instructions, and detect, for each processor of the processors, at least one instruction that the each processor is to execute or at least one instruction that the each processor is not to execute; and a function for determining a hardware configuration of the each processor and outputting the hardware configuration based on a detection result of the detection function.

12. A system, comprising:

a detection function for performing detection for all instructions constituting the software program executed by the plurality of processors of the high-level synthesis multiprocessor system according to claim 7, to identify one of the processors to execute each instruction of the all instructions, and detect, for each processor of the processors, at least one instruction that the each processor is to execute or at least one instruction that the each processor is not to execute; and a function for determining a hardware configuration of the each processor and outputting the hardware configuration based on a detection result of the detection function.

* * * * *